United States Patent
Ohara et al.

(10) Patent No.: US 7,452,599 B2
(45) Date of Patent: Nov. 18, 2008

(54) FINE SILICA PARTICLES HAVING SPECIFIC FRACTAL STRUCTURE PARAMETER

(75) Inventors: Masakazu Ohara, Yamaguchi (JP);
Minoru Kimura, Yamaguchi (JP);
Hiroo Aoki, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 121 days.

(21) Appl. No.: 10/540,886

(22) PCT Filed: Dec. 25, 2003

(86) PCT No.: PCT/JP03/16726

§ 371 (c)(1),
(2), (4) Date: Dec. 29, 2005

(87) PCT Pub. No.: WO2004/060802

PCT Pub. Date: Jul. 22, 2004

(65) Prior Publication Data

US 2006/0150527 A1    Jul. 13, 2006

(30) Foreign Application Priority Data

Dec. 27, 2002    (JP) ............................. 2002-380774

(51) Int. Cl.
*B32B 5/16* (2006.01)
(52) U.S. Cl. ........................ 428/403; 428/331
(58) Field of Classification Search ............ 428/402, 428/403, 331
See application file for complete search history.

(56) References Cited

U.S. PATENT DOCUMENTS 3,772,427 A * 11/1973 Moore ..................... 423/337
4,067,954 A * 1/1978 Volling ..................... 423/336

(Continued)

FOREIGN PATENT DOCUMENTS

EP    0 285 450 A    10/1988

(Continued)

OTHER PUBLICATIONS

Huang et al., "Influence of Calciation Procedure on Porosity and Surface Fractual Dimensions of Silica Xerogels Prepared under Different Evaporation Conditions," *Journal of Colloid and Interface Science*, 2000, pp. 152-157, vol. 231, 2, experimental, table 2, Fig. 14.

(Continued)

*Primary Examiner*—H. T Le
(74) *Attorney, Agent, or Firm*—Buchanan Ingersoll & Rooney PC

(57) ABSTRACT

This invention provides flame-generated fine silica particles having an average particle size of 0.05 to 1 μm, wherein a fractal structure parameter $\alpha_1$ at length scales ranging from 50 nm to 150 nm and a fractal structure parameter $\alpha_2$ at length scales ranging from 150 nm to 353 nm satisfy the following formulas (1) and (2):

$$-0.0068S+2.548 \leq \alpha_1 \leq -0.0068S+3.748 \quad (1)$$

$$-0.0011S+1.158 \leq \alpha_2 \leq -0.0011S+2.058 \quad (2)$$

wherein S is a BET specific surface area (m²/g) of the fine silica particles,
in the measurement of small-angle X-ray scattering. When used as a filler for a semiconductor-encapsulation resin or when used as a filler for a polishing agent or for a coating layer for ink jet papers, the fine silica particles are available at high content without substantial enhancement of the viscosity. Besides, when used as a filler for the resin, the fine silica particles improve the strength of the molding compound. Furthermore, when used as a toner additive for electrophotography, the fine silica particles improve the free-flow property of the toner without removal from the toner surfaces.

4 Claims, 1 Drawing Sheet

U.S. PATENT DOCUMENTS

| | | | |
|---|---|---|---|
| 4,370,292 | A | 1/1983 | Yanase et al. |
| 5,340,560 | A * | 8/1994 | Rohr et al. .............. 423/337 |
| 6,063,354 | A * | 5/2000 | Mangold et al. ........... 423/336 |
| 6,214,507 | B1 | 4/2001 | Sokol et al. |
| 7,083,770 | B2 * | 8/2006 | Shibasaki et al. ........... 423/335 |
| 2002/0041963 | A1 | 4/2002 | Konya et al. |
| 2002/0102199 | A1 * | 8/2002 | Nishimine et al. .......... 423/337 |

FOREIGN PATENT DOCUMENTS

| | | |
|---|---|---|
| EP | 8-245214 A | 9/1996 |
| EP | 855368 A1 | 7/1998 |
| EP | 1182514 A2 | 2/2002 |
| JP | 08-188822 | 7/1996 |
| JP | 11-325440 | 11/1999 |
| WO | WO 01/98211 A1 * | 12/2001 |
| WO | WO 2004/060802 A1 * | 7/2004 |
| WO | WO 2006/123433 A1 * | 11/2006 |

OTHER PUBLICATIONS

D. W. Schaefer et al., "Fractal geometry of colloidal aggregates," Physical Review Letters USA, vol. 52, No. 26, pp. 2371-2374, Jun. 25, 1984.

Imre Dekany et al, "Small angle X-ray scattering of hydrophilic and hydrophobic $SiO_2$ particles," Colloids and Surfaces A: Physicochemical and Engineering Aspects, Elsevier Science B.V., Amsterdam, Netherlands, vol. 126, No. 1, pp. 59-66, Jun. 13, 1997.

Michael R. Zachariah et al., "Dynamic light scattering and angular dissymmetry for the in situ measurement of silicon dioxide particle synthesis in flames," Applied Optics, OSA, Optical Society of America, Washington, DC, US, vol. 28, No. 3, pp. 530-536, Feb. 1, 1989.

J. E. Martin et al., "Fractal geometry of vapor-phase aggregates," Physical Review A (General Physics) USA, vol. 33, No. 5, pp. 3540-3543, May 1986.

* cited by examiner

PLOT OF LOG OF SCATTERED X-RAY INTENSITY I VERSUS LOG OF SCATTERING WAVE VECTOR k FOR FINE SILICA PARTICLES ($35 m^2/g$)

FINE SILICA PARTICLES HAVING SPECIFIC FRACTAL STRUCTURE PARAMETER

FIELD OF THE INVENTION

The present invention relates to novel fine silica particles. More particularly, the invention relates to fine silica particles having a special structure which is simpler than that of fumed silica particles and is more complex than that of spherical fused silica particles. The fine silica particles exhibit excellent performance when used in such applications as a filler for a semiconductor-encapsulation resin and as a toner additive for electrophotography.

BACKGROUND OF THE INVENTION

In the applications such as a filler for the semiconductor-encapsulation resin and a toner additive for electrophotography, fine silica particles having an average particle size of not larger than 1 µm have been widely used. This is because, when used as a filler for a semiconductor-encapsulation resin, the fine silica particles having the aforementioned particle size are advantageous for maintaining a homogeneous composition since they precipitate little when the resin compound is in a molten state or in a liquid state (also referred to as liquid resin). Furthermore when used as a toner additive for electrophotography, the fine silica particles having the above particle size adhere to the toner surfaces and are advantageous for improvement of free-flow properties.

There have heretofore been made many reports about the use of fumed silica (so-called dry silica) particles produced by a flame hydrolysis process of chlorosilane as a filler for the semiconductor-encapsulation resin (see, for example, a prior document A).

Prior document A: JP-A-1-161065

In recent years, the enhanced sensitivity to environmental problems has grew a trend to use lead-free solders to mount semiconductor packages on circuit boards. The use of lead-free solders, however, causes an increase in temperature at which the packages are mounted and requires improvement of heat resistance of the packages. That has led to the higher filler content of the semiconductor resin compound.

Even at low content of the liquid resin, however, the aforesaid fumed silica substantially enhances of viscosity. At high content of the resin, therefore, it is difficult to mold the semiconductor-encapsulation resin.

To suppress the enhancement viscosity by adding the fumed silica particles to the resin at high content the use of a spherical fused silica having an average particle size which is controlled to be not larger than 1 µm has been proposed. (see, for example, a prior document B).

Prior document B: JP-A-8-245214

Indeed, the use of the spherical fused silica prevents enhancement of the viscosity of the resin and the silica can be filled at high content of the resin, but the resin compound comprising the spherical fused particles doesn't have satisfactory strength.

There have further been reports about the use of the fumed silica as a toner additive for electrophotography (see, for example, a prior document C). Due to its complex particle structure, however, the fumed silica doesn't improve free-flow properties of the toner. There has further been some reports about the use of the spherical fused silica as a toner additive (see, for example, a prior document D). Due to its spherical shape, however, the spherical fused silica particles don't significantly toner surfaces; i.e., the toner particle surfaces from which the fine silica particles are removed come in contact with the photoconductor surface. That causes a problem in that the toner particles is not transferred onto the paper and remain on the photoconductor surfaces.

Prior document C: JP-A-2002-116575
Prior document D: JP-A-2002-154820

DESCRIPTION OF THE INVENTION

It is, therefore, an object of the present invention to solve the problem caused by the use of fumed silica particles and spherical fused silica particles which are not larger than 1 µm in size as a filler for a semiconductor-encapsulation resin and a toner additive for electrophotography.

In order to solve the problem, the present inventors have studied the conditions for producing the fine silica particles, viscosity-imparting action of the fine silica particle, property for reinforcing the strength of the resin, effect for imparting the fluidity and effect for preventing the removal thereof from the surfaces of the toner resin particle surfaces. As a result, the present inventors have succeeded in developing fine silica particles having special structure which is simpler than that of fumed silica particles and is more complex than that of spherical fused silica particles by setting up special conditions in producing the fine silica particles by a flame process such as a flame hydrolysis method or a frame pyrolysis method (hereinafter also referred to as the flame reaction method).

The present invention provides fine silica particles having an average particle size of 0.05 to 1 µm, wherein in a measurement of small-angle X-ray scattering, a fractal structure parameter $\alpha_1$ at length scales ranging from 50 nm to 150 nm and a fractal structure parameter $\alpha_2$ at length scales ranging from 150 nm to 353 nm satisfy the following formulas (1) and (2):

$$-0.0068S+2.548 \leq \alpha_1 \leq -0.0068S+3.748 \quad (1)$$

$$-0.0011S+1.158 \leq \alpha_2 \leq -0.0011S+2.058 \quad (2)$$

wherein S is a BET specific surface area (m²/g) of the fine silica particles,

This invention, furthermore, provides a semiconductor-encapsulation resin comprising the aforementioned fine silica particles, and a toner additive for electrophotography.

In general, a fractal structure parameter ($\alpha$-value) determined by small-angle X-ray scattering represents complexity of structure of particles. Particles with small $\alpha$-values have more complex structure. It is noted that truly spherical particles have an $\alpha$-value of 4.

The present inventors have compared the fine silica particles of the present invention having the above special particle structure with the conventional fine silica particles for their $\alpha$-values, and have confirmed that the fine silica particles of the present invention have an $\alpha$-value ($\alpha_1$) found from the scattering pattern over a range of analysis of 50 nm to 150 nm and an $\alpha$-value ($\alpha_2$) found from the scattering pattern over a range of analysis of 150 nm to 353 nm, which are singular values as compared to those of the conventional fine silica particles.

When added at high content to the liquid resin, the fine silica particles having the special structure prevent the enhancement of the viscosity and provides the cured resin compound with satisfactory strength. When used as a toner additive for electrophotography, further, the silica particles improve excellent flow properties and are not removed from the toner surface.

The measurement of the small-angle X-ray scattering makes it possible to obtain the data related to the periodic structure of finer than nanometers (data related to the period and frequency of the structure) that could not be obtained with the ordinary X-ray diffraction and, hence, to determine the α-values based on the data. For example, when the fumed silica is measured for its small-angle X-ray scattering, a curve of low-angle scattering turns out to be the superposition of scattering curves due to periods of various sizes, since the fumed silica is the aggregates of very strongly aggregated particles (or melt-adhered particles) having various structures and particle sizes being formed by the bonding of a plurality of primary particles depending upon the production method thereof.

Therefore, analysis of the obtained curves of small-angle scattering of X-rays makes it possible to determine the "fractal structure parameter (α-value) which serves as an index that represents the structure of the aggregated (melt-adhered) particles" for the frequency of the periodic structures of various sizes. Namely, the following relationship exists among the scattering intensity (I) in the small-angle scattering of X-rays, scattering vector (k) and fractal structure parameter (α). Therefore, the α-value can be determined from the curve of small-angle scattering of X-rays plotted with the abscissa as k and the ordinate as I, i.e., $$I \propto k^{-\alpha}$$

where $k = 4\pi\lambda^{-1} \sin\theta$

Here, the unit of k is $nm^{-1}$, π is the circular constant, λ is a X-ray wavelength (unit in nm), and θ is a X-ray scattering angle (here θ is a value of when the scanning angle of the detector is multiplied by 0.5 times).

To obtain a small-angle X-ray scattering curve, the X-ray that are monochromed are finely squeezed by using a slit and a block, irradiated onto a sample, the X-ray scattered by the sample are detected while varying the scanning angle of the detector and are plotted with the abscissa as k and the ordinate as I.

If plotted on a log-log scale, the slope is equal to $-\alpha$. Further, if the range of analysis is denoted by D, there exists the following Bragg's formula among the D, an X-ray scattering angle θ and an X-ray wavelength λ, $$2D \sin\theta = \lambda$$

Hence, the following relationship between k and D is derived from the Bragg's formula, $$D = 2\pi k^{-1}$$

As shown in FIG. 1, therefore, when the plot of log I versus log k is sectionalized by, Log k=−1.377 to −0.902 (D=50 to 150 nm) and Log k=−1.750 to −1.377 (D=150 to 353 nm), the slopes of the sectionalized ranges determine fractal structure parameters ($\alpha_1$ and $\alpha_2$).

The fine silica particles of the present invention have features of both the spherical particles and the particles having complex structure. These features result in prevent of enhancement of viscosity of the resin at high filler content of the resin. Further, in preparing a silica dispersion as a polishing agent or as a coating solution for the ink-jet papers, the fine silica particles of the present invention do not significantly enhance the viscosity of the solution at high content.

Further, when used as a toner additive for electrophotography, the fine silica particles of the present invention improve free-flow properties of the toner due to their special particle structure without removal from the toner surfaces.

BEST EXECUTION OF THE INVENTION

Figure 1:
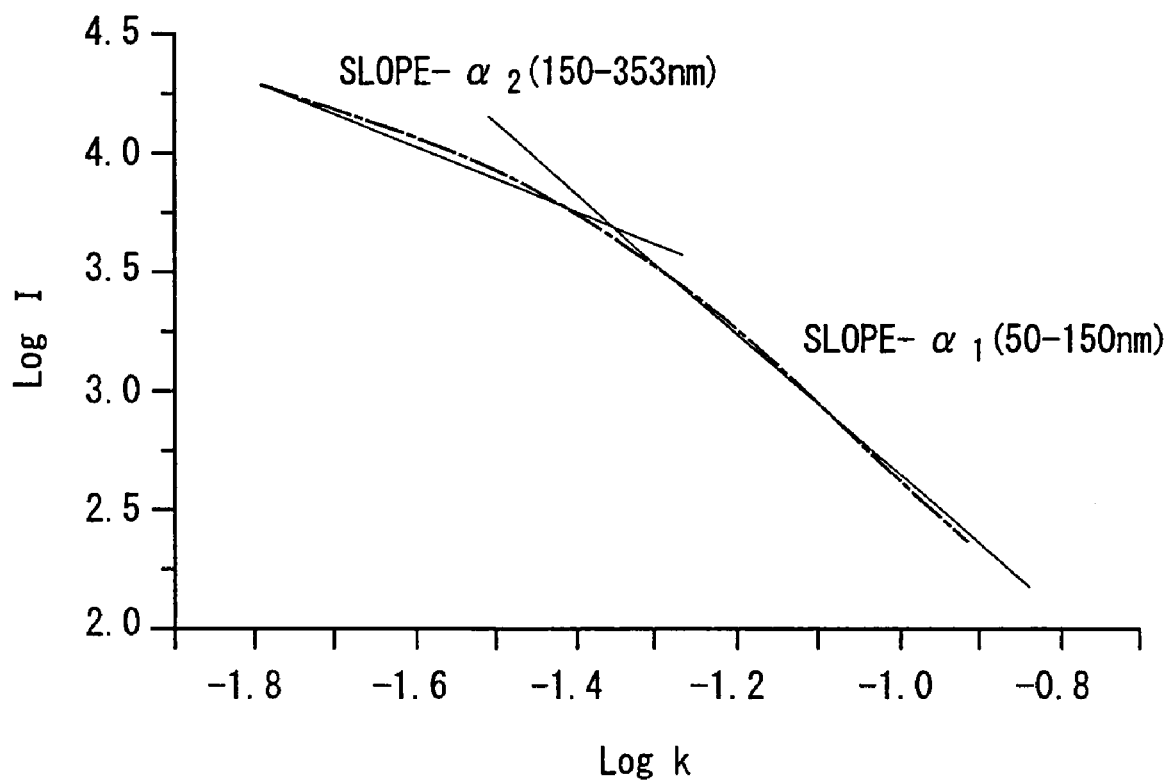
FIG. 1 is a diagram illustrating a method of determination of $\alpha_1$ and $\alpha_2$ from a plot of log of scattered X-ray intensity I versus log of scattering wave vector k for an inorganic powder by small-angle X-ray scattering.

The fine silica particles of the present invention have an average particle size of 0.05 to 1 μm and, preferably, 0.1 to 1 μm. When the average particle size is smaller than 0.05 μm, the fractal structure parameters α1 and α2 that will be described later is smaller than the ranges represented by the formulas (1) and (2). When the average particle size is larger than 1 μm, on the other hand, the fractal structure parameters $\alpha_1$ and $\alpha_2$ is greater than the ranges represented by the formulas (1) and (2).

Here, the average particle size is an average value (D50) based on volume as determined by a laser scattering particle size distribution analyzer.

The fine silica particles of the present invention have the novel feature in that the fractal structure parameter $\alpha_1$ at length scales ranging from 50 nm to 150 nm satisfies the following formula (1) and the fractal structure parameter $\alpha_2$ at length scales ranging from 150 nm to 353 nm satisfies the following formula (2), $$-0.0068S+2.548 \leq \alpha_1 \leq -0.0068S+3.748 \quad (1)$$

$$-0.0011S+1.158 \leq \alpha_2 \leq -0.0011S+2.058 \quad (2)$$

wherein S is a BET specific surface area of the fine silica particles.

Of the fractal structure parameters of the fine silica particles, the fractal structure parameter $\alpha_1$ in the range of analysis of 50 nm to 150 nm represents the complexity of the structure in a range of relatively small particle sizes of aggregated particles among the aggregated particles having various structure and particle sizes formed by the melt-adhesion of a plurality of primary particles, and the fractal structure parameter $\alpha_2$ in the range of analysis of 150 nm to 353 nm represents the complexity of the structure in a range of relatively large particle sizes of aggregated particles. Usually, $\alpha_1$ and $\alpha_2$ maintain a relationship $\alpha_1 > \alpha_2$.

The fine silica particles having complex structure as described above are proposed for the first time by the present invention. As described later in Comparative Examples, the conventional fumed silica described above has α-values which are smaller than the lower limits of the above-mentioned ranges and, hence, it has more complex structure. The spherical fused silica has α-values which are larger than the upper limits of the above-mentioned ranges and, hence, it has structure close to that of spherical silica. On the other hand, the fine silica of the present invention having α-values which are within the ranges the formulas (1) and (2) shows, and, hence, it has complexity of structure lying between that of the fumed silica and the spherical fused silica.

The fine silica particles of the present invention having the average particle size and the fractal structure parameters as described above, generally, possess a BET specific surface area ranging from 5 to 300 $m^2/g$ at an average particle size of 0.05 to 1 μm, and ranging from 5 to 150 $m^2/g$ at an average particle size of 0.1 to 1 μm.

The above BET specific surface area is determined by the nitrogen absorption method.

Owing to their special particle structure, the fine silica particles of the present invention overcome the above-mentioned problems and outperform the fumed silica particles and the spherical fused silica particles.

For example, in the use as a filler for the semiconductor-encapsulation resin, the fine silica particles of the invention are available at high content of the resin and keep the homogeneous composition. In the use as a toner additive for electrophotography, the fine silica particles of the invention improve flow properties of the toner without removal from the toner surfaces.

There is no particular limitation on other properties of the fine silica particles of the present invention provided the above-mentioned conditions are satisfied. It is, however, desired that the fine silica particles of the invention contain halogen elements and alkali elements such as sodium at a concentration which is not higher than 50 ppm and, preferably, not higher than 30 ppm from the standpoint of prevention of corrosion of the metal wiring and, besides, from the standpoint of suppressing dispersion in the amount of charge and in the rise rate of charge when used as a toner additive for electrophotography.

(Method of Producing the Fine Silica Particles)

The fine silica particles of the present invention can be produced in a flame process such as a flame hydrolysis process or a flame pyrolysis process. In particularly, they can be obtained in a manner of controlling agglomeration of particles and melt-adhering them together in a flame.

For instance, hydrogen and/or hydrocarbons (hereinafter referred to as inflammable gases) and oxygen are introduced through an outer tube of a central feed tube where silicon compound is introduced in a gas state to form an outer flame. The silicon compound reacts in the flame to produce fine silica particles. The silica particles are aggregated to a suitable degree in the flame and, then, the silica particles are cooled and collected in a dispersed state (e.g., introduced through a pipe and collected using a bag filter).

In the aforementioned production, one of the conditions that particularly affects the fractal structure parameters is the outlet velocity, and it is preferred that the velocity is controlled to be 0.5 to 10 m/sec.

Another condition that particularly affects the fractal structure parameters is the concentration of the silicon compound, i.e., the silica concentration in the flame. It is preferred that the silica concentration between 0.05 and 5 mol/m$^3$, in particularly, between 0.1 and 3 mol/m$^3$.

In the production, the average particle size and the specific surface area are controlled by adjusting the concentration of the silicon compound, the outlet velocity and outer flame length. The fractal structure parameters are controlled by adjusting the above-mentioned conditions and, further, adjusting the temperature of the outer flame.

In general, higher concentration of the silicon compound results in larger average particle size, smaller specific surface area and larger values of the fractal structure parameters. Further, higher outlet velocity results in smaller average particle size, larger specific surface area and smaller values of the fractal structure parameters. Further, larger outer circumferential flame results in larger average particle size, smaller specific surface area and larger values of the fractal structure parameters. Moreover, higher outer flame temperature results in larger average particle size, smaller specific surface area and larger values of the fractal structure parameters.

In the production, there is no limitation on the use of the silicon compound which is in a gaseous state or in a liquid state at room temperature. As a silicon compound, there can be used, for example, siloxanes such as hexamethylcyclotrisiloxane, octamethylcyclotetrasiloxane, decamethylcyclopentasiloxane, hexamethyldisiloxane, and octamethyltrisiloxane; alkoxysilanes such as tetramethoxysilane, tetraethoxysilane, methyltrimethoxysilane, dimethyldimethoxysilane and methyltriethoxysilane; organosilane compounds such as tetramethylsilane, diethylsilane and hexamethyldisilazane; silicon halides such as monochlorosilane, dichlorosilane, trichlorosilane and tetrachlorosilane; and inorganic silane compounds such as monosilane and disilane.

Using the silanes and/or silazanes or alkoxysilane as the silicon compound, in particular, a highly pure silicon oxide (fine silica particles) which contains little impurities such as chlorine and are easily handled can be obtained.

The fine silica particles of the present invention may be treated for their surfaces with at least one treating agent selected from a group consisting of silylating agents, silicone oils, silanes, metal alkoxides, fatty acids and metal salts of the fatty acids.

Concrete examples of the silylating agent include alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane; and silazanes such as hexamethyldisilazene, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane and dimethyltetravinyldisilazane.

As the silicone oil, there can be exemplified dimethyl silicone oil, methyl hydrogen silicone oil, methyl phenyl silicone oil, alkyl-modified silicone oil, fatty acid-modified silicone oil, polyether-modified silicone oil, alkoxy-modified silicone oil, carbinol-modified silicone oil, amino-modified silicone oil and terminally reactive silicone oil.

As the siloxanes, there can be exemplified hexamethylcyclotrisiloxane, octamethylcyclotetrasiloxane, decamethylcyclopentasiloxane, hexamethyldisiloxane and octamethyltrisiloxane.

As the metal alkoxide, there can be exemplified trimethoxyaluminum, triethoxyaluminum, tri-i-propoxyaluminum, tri-n-butoxyaluminum, tri-s-butoxyaluminum, tri-t-butoxyaluminum, mono-s-butoxydi-i-propylaluminum, tetramethoxytitanium, tetraethoxytitanium, tetra-i-propoxytitanium, tetra-n-propoxytitanium, tetra-n-butoxytitanium, tetra-s-butoxytitanium, tetra-t-butoxytitanium, tetraethoxyzirconium, tetra-i-propoxyzirconium, tetra-n-butoxyzirconium, dimethoxytin, diethoxytin, di-n-butoxytin, tetraethoxytin, tetra-i-propoxytin, tetra-n-butoxytin, diethoxyzinc, magnesium methoxide, magnesium ethoxide and magnesium isopropoxide, Further, concrete examples of the fatty acid and metal salt thereof include long-chain fatty acids such as undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid and arachidonic acid, and salts thereof with metals such as zinc, iron, magnesium, aluminum, calcium, sodium and lithium.

Among the surface-treating agents, it is preferred to use at least one treating agent selected from the group consisting of hexamethyldisilazane, dimethyl silicone oil, γ-aminopropyl-triethoxysilane and γ-(2-aminoethyl)aminopropylmethyldimethoxysilane to treat the surfaces of the fine silica particles that are used as a toner additive for electrophotography.

Every method is available without limitation in treating the surfaces with the aforesaid surface-treating agent. A method comprising, for example, spraying a surface-treating agent while stirring the fine silica particles or contacting the surface-treating agent with the gas is generally employed.

Further, the fine silica particles in which the concentration of halogen and/or alkali is not larger than 50 ppm and, preferably, not larger than 30 ppm prevent the corrosion of metals and suppress the dispersion in the amount of charge and in the charge rise rate when used as a toner additive for electrophotography. It is preferred to use a treating agent which is refined enough to achieve the purity.

When used as a filler for the semiconductor-encapsulation resin, the fine silica particles of the present invention are filled at the content ranging from 5 to 300 wt. parts per 100 wt. parts of the liquid resin. As the liquid resin, an uncured thermosetting resin that is used to mold the semiconductor, such as an epoxy resin, phenol resin, polyimide resin or maleimide resin is available. The liquid resin usually comprises a curing agent, a cure accelerator, a coloring agent and a mold releasing agent and the filler. The above-mentioned fine silica particles of the present invention having a small average particle size are used after being mixed with the particles of other fillers having large average particle sizes (e.g., fused spherical silica particles) so as to fill the gaps of the filler particles having large particle sizes.

Further, when used as a toner additive for electrophotography, the fine silica particles of the present invention are generally added in an amount of 0.2 to 3 parts in weight per 100 parts in weight of the toner resin particles.

EXAMPLES

The invention will be described more concretely of Examples and Comparative Examples. The invention, however, is not limited in these manners. In the Examples and Comparative Examples, the properties were measured as follows.

1. Measurement of Small-Angle X-Ray Scattering

The sample fine silica particles were filled in a through hole (40 mm deep, 5 mm wide, 1 mm high) in a base plate, and both sides of the filled sample were held by 6 μm-thick polypropylene films. The measurement was taken using a biaxial small-angle X-ray scattering apparatus (M18XHF22) equipped with the Kratzky-U-slit manufactured by Mac Science Co. under the following conditions.

X-ray: Cu—Kα ray
Tube voltage: 40 kV
Tube current: 300 mA
Slit width: 10 μm
Detector scanning angle: 0.025 deg to 0.900 deg 2. Measurement of Average Particle Size A median particle size (D50) based on volume was measured using a laser scattering particle size distribution analyzer (LA-920) manufactured by Horiba Seisakujo Co. To take the measurement, a silica slurry was prepared as a measuring sample by adding 0.5 g of fine silica particles to 150 ml of pure water and dispersing the fine silica particles using an ultrasonic homogenizer of an output of 200 W for a minute.

3. Measurement of Specific Surface Area

The specific surface area was determined by using a nitrogen adsorption analyzer (SA-1000) manufactured by Shibata Rikagaku-sha Co.

4. Measurement of Viscosity

The fine silica particles were added in an amount of 4 wt. parts to an epoxy resin (Epikote 815) manufactured by Japan Epoxy Resin Co., and the mixture was dispersed at room temperature by using a homo-mixer manufactured by Tokushu Kika Kogyo Co. at 3000 rpm for 2 minutes. The mixture was, left in a thermostat at 25° C. for 2 hours, and, then, was measured for its viscosity by using a BL-type rotary viscometer at 60 rpm.

5. Strength of the Cured Resin Compound at High Filler Content

The resin compound was blended with various components at ratios as described below, kneaded by using heated rolls, cooled and pulverized to obtain an epoxy resin composition. The epoxy resin composition was thermally set in a metal mold heated at 175° C. to obtain a cured epoxy resin article measuring 10 mm×20 mm×5 mm. Ten compounds of the cured epoxy resin were left in a thermo-hygrostat at a temperature of 25° C. and a relative humidity of 80% for 24 hours, and were dipped in an oil bath maintained at 250° C. for 10 seconds. The strength of the cured epoxy resin was determined from the number of the cracks.

[Composition of Epoxy Resin Compound]
Epoxy resin (biphenyl epoxy resin): 100 wt. parts
Curing agent (phenol novolak resin): 52.3 wt. parts
Curing accelerator (triphenylphosphine): 3.0 wt. parts
mold releasing agent (ester wax): 14.9 wt. parts
Coloring agent (carbon black): 3.0 wt. parts
Silane coupling agent (epoxysilane): 6.0 wt. parts
Fused spherical silica (average particle size, 17 μm): 1238.8 wt. parts
Sample fine silica particles: 74.6 wt. parts 6. Evaluation of Characteristics as a Toner Additive for Electrophotography To evaluate the properties (fluidity, image characteristics, cleaning property) of a toner additive for electrophotography, as described below, the silica surfaces were treated with the hexamethyldisilazane to be hydrophobic. The treatment with the hexamethyldisilazane to render the surfaces to be hydrophobic was conducted in a manner as described below. First, the fine silica particles were introduced into a mixer, and stirred. Then, in the nitrogen atmosphere, the fine silica particles were heated at 250° C. Thereafter, the mixer was closed, and the hexamethyldisilazane was sprayed in an amount of 60 wt. parts. The mixture was, then, stirred for 30 minutes and the surfaces were treated to be hydrophobic.

6-1. Free-Flow Property

The silica sample was added in an amount of 2 wt % to the spherical polystyrene resin (SX-500H, average particle size of 5 μm, manufactured by Soken Kagaku Co.), and the mixture was blended together by using a mixer for 5 minutes. The mixture was put at 35° C. and at a relative humidity of 85%. The free-flow property of the mixed powder sample was evaluated by measuring the degree of compression by using a powder tester (model PT-R, manufactured by Hosokawa Micron Co.). The degree of compression is expressed by the following formula (3), Degree of compression=(packed bulk density−aerated bulk density)/(packed bulk density)×100  (3)

In the above formula (3), aerated bulk density and packed bulk density are as follows:

Aerated bulk density: specific gravity of the sample power introduced into a 100-ml cup without effecting the tapping.

Packed bulk density: specific gravity of the sample powder introduced into a 100-ml cup after tapped 180 times.

It was judged that the smaller the degree of compression, the better the free-flow property.

The degree of compression of the samples with the mixing time of 60 minutes was also measured to evaluate the durability of the free-flow property.

6-2. Image Characteristics

A toner composition was prepared by adding the above silica sample in an amount of 1% to the toner having an average particle size of 7 μm, and stirring and mixing them together. By using this toner composition, 30,000 sheets of paper were passed through a copy machine. Thereafter, 10 sheets of the B4 size paper were passed through the machine in a solid image manner such that the surfaces were all solid black. It was so judged that the smaller the occurrence of white spots in the image, the better the image characteristics.

◯: Almost no white spot
Δ: White spots are seen to some extent.
X: White spots are seen much.

6-3. Cleaning Property

The cleaning property was evaluated by eyes. That is, after the aforementioned evaluation of the image characteristics, flaws and residual toners were observed by eyes and their effects upon the output image were evaluated by eyes.

◎: No flaws or no residual toner.
◯: A slight degree of flaws which don't affect the image.
Δ: There were residual toner and flaws which little affect the image.
X: There was a considerable residual toner causing defect on the image such as stripes.
XX: The residual toner adhered and many defects on the image occurred.

7. Analysis of Impurities

Elements such as iron, aluminum, chrome, nickel, sodium and chlorine were determined by an ICP emission spectrophotometry, atomic absorption method or ion chromatography.

Examples 1 to 4

Fine silica particles shown in Table 2 were produced by burning and oxidizing an octamethylcyclotetrasiloxane in an oxygen-hydrogen flame under the conditions described in Table 1.

Table 1 also shows average particle sizes, BET specific surface areas, fractal structure parameters $\alpha_1$ and $\alpha_2$ of the obtained silica particles and viscosity of the resin compounds comprising the obtained silica as well as strength of the cured resin compounds. The viscosity of Examples was not enhanced compared with that of Comparative Examples. Table 3 shows the concentrations of impurities in the silica.

Comparative Examples 1 to 5

Table 2 shows average particle sizes, BET specific surface areas, fractal structure parameters $\alpha_1$ and $\alpha_2$, of commercial fumed silica particles and fused silica particles viscosity of the resin compounds comprising the commercial silica and strength of the cured resin compounds.

In Comparative Examples, the viscosity of the compounds was too high to be kneaded with the heated rolls. Therefore, the strength of the cured resins could not be measured. The concentrations of impurities were as shown in Table 3.

TABLE 1

| | Condition | | | |
|---|---|---|---|---|
| | A (mol) | Hydrogen (mol) | Theoretical combustion heat for 1 mol of silica (kcal) | Oxygen (ratio) | Outlet velocity (m/sec)[*1] |
| Ex. 1 | 1 | 160 | 2753 | 1.0 | 1.0 |
| Ex. 2 | 1 | 40 | 1025 | 2.1 | 1.1 |
| Ex. 3 | 1 | 160 | 2753 | 1.6 | 0.9 |
| Ex. 4 | 1 | 160 | 2753 | 2.1 | 1.1 |

[*1]Value in the standard state.
The character 'A' stands for octamethylcyclotetrasiloxane.

TABLE 2

| | Fine silica particles | | | | | |
|---|---|---|---|---|---|---|
| | Average particle size (μm) | Specific surface area (m²/g) | $\alpha_1$ | $\alpha_2$ | Viscosity (cPs) | Strength of cured resin |
| Ex. 1 | 0.2 | 35 | 2.766 | 1.293 | 1090 | 1 |
| Ex. 2 | 0.2 | 65 | 2.367 | 1.706 | 1280 | 0 |
| Ex. 3 | 0.1 | 110 | 2.199 | 1.233 | 1360 | 0 |
| Ex. 4 | 0.1 | 150 | 1.882 | 1.294 | 1460 | 0 |
| Comp. Ex. 1 | 0.2 | 63 | 2.031 | 1.023 | 1750 | impossible to measure[*2] |
| Comp. Ex. 2 | 0.1 | 82 | 1.635 | 0.931 | 1800 | impossible to measure[*2] |
| Comp. Ex. 3 | 0.1 | 145 | 1.386 | 0.914 | 1980 | impossible to measure[*2] |
| Comp. Ex. 4 | 0.4 | 11 | 3.112 | 2.135 | 950 | 8 |
| Comp. Ex. 5 | 0.6 | 6 | 3.314 | 1.867 | 880 | 10 |

[*2]Because of the enhancement of the viscosity of the epoxy resin compound, they could not be kneaded with the heated rolls, and the strengths of the cured resins could not be measured.

TABLE 3

| | Concentrations of impurities (ppm) | | | | | |
|---|---|---|---|---|---|---|
| | Fe | Al | Ni | Cr | Na | Cl |
| Ex. 1 | <20 | <5 | <5 | <5 | <3 | <3 |
| Ex. 2 | <20 | <5 | <5 | <5 | <3 | <3 |
| Ex. 3 | <20 | <5 | <5 | <5 | <3 | <3 |
| Ex. 4 | <20 | <5 | <5 | <5 | <3 | <3 |
| Comp. Ex. 1 | <20 | <5 | <5 | <5 | <3 | <50 |
| Comp. Ex. 2 | <20 | <5 | <5 | <5 | <3 | <50 |
| Comp. Ex. 3 | <20 | <5 | <5 | <5 | <3 | <50 |
| Comp. Ex. 4 | <20 | <5 | <5 | <5 | <3 | <3 |
| Comp. Ex. 5 | <20 | <5 | <5 | <5 | <3 | <3 |

Examples 5 to 8

Fine silica particles were produced by combustion and oxidation of the octamethylcyclotetrasiloxane in the oxygen-hydrogen flame under the conditions described in Table 4.

Table 4 also shows average particle sizes, BET specific surface areas, and fractal structure parameters $\alpha_1$ and $\alpha_2$ of the obtained fine silica particles, as well as evaluated properties (free-flow property, image characteristics, cleaning property) as a toner additive for electrophotography. Table 5 shows the concentrations of impurities.

Comparative Examples 6 to 10

Table 4 shows average particle sizes, BET specific surface areas, and fractal structure parameters $\alpha_1$ and $\alpha_2$ of commercial fumed silica particles and fused silica particles, as well as evaluated properties (free-flow property, image characteristics, cleaning property) as a toner additive for electrophotography. The concentrations of impurities were as shown in Table 5.

TABLE 4

| | Reactants | | | | |
|---|---|---|---|---|---|
| | Octamethylcyclotetrasiloxane (mols) | Hydrogen (mols) | Theoretical combustion heat for 1 mole of silica (kcal) | Oxygen (ratio) | Outlet velocity (Nm/sec) |
| Ex. 5 | 1 | 160 | 2753 | 1.0 | 1.0 |
| Ex. 6 | 1 | 40 | 1025 | 2.1 | 1.1 |
| Ex. 7 | 1 | 160 | 2753 | 1.6 | 0.9 |
| Ex. 8 | 1 | 160 | 2753 | 2.1 | 1.1 |
| Comp. Ex. 6 | — | — | — | — | — |
| Comp. Ex. 7 | — | — | — | — | — |
| Comp. Ex. 8 | — | — | — | — | — |
| Comp. Ex. 9 | — | — | — | — | — |
| Comp. Ex. 10 | — | — | — | — | — |

| | Fine silica particles | | | | | | | |
|---|---|---|---|---|---|---|---|---|
| | Average particle size (μm) | Specific surface area (m²/g) | $\alpha_1$ | $\alpha_2$ | Free properties (composition degree) mixed 5 min. | mixed 60 min. | Image characteristics | Cleaning property |
| Ex. 5 | 0.2 | 35 | 2.766 | 1.293 | 28.5 | 29.1 | ○ | ○ |
| Ex. 5 | 0.2 | 65 | 2.367 | 1.706 | 26.9 | 27.2 | ○ | ◎ |
| Ex. 5 | 0.1 | 110 | 2.199 | 1.233 | 25.2 | 26.1 | ○ | ◎ |
| Ex. 5 | 0.1 | 150 | 1.882 | 1.294 | 22.1 | 23.4 | ○ | ◎ |
| Comp. Ex. 6 | 0.2 | 63 | 2.031 | 1.023 | 35.6 | 39.8 | X | X |
| Comp. Ex. 7 | 0.1 | 82 | 1.635 | 0.931 | 32.2 | 35.9 | Δ | Δ |
| Comp. Ex. 8 | 0.1 | 145 | 1.386 | 0.914 | 27.1 | 34.7 | Δ | Δ |
| Comp. Ex. 9 | 0.4 | 11 | 3.112 | 2.135 | 38.1 | 41.2 | X | XX |
| Comp. Ex. 10 | 0.6 | 6 | 3.314 | 1.867 | 39.7 | 42.5 | X | XX |

TABLE 5

| | Concentrations of impurities (ppm) | | | | | |
|---|---|---|---|---|---|---|
| | Fe | Al | Ni | Cr | Na | Cl |
| Ex. 5 | <20 | <5 | <5 | <5 | <3 | <3 |
| Ex. 6 | <20 | <5 | <5 | <5 | <3 | <3 |
| Ex. 7 | <20 | <5 | <5 | <5 | <3 | <3 |
| Ex. 8 | <20 | <5 | <5 | <5 | <3 | <3 |
| Comp. Ex. 6 | <20 | <5 | <5 | <5 | <3 | <50 |
| Comp. Ex. 7 | <20 | <5 | <5 | <5 | <3 | <50 |
| Comp. Ex. 8 | <20 | <5 | <5 | <5 | <3 | <50 |
| Comp. Ex. 9 | <20 | <5 | <5 | <5 | <3 | <3 |
| Comp. Ex. 10 | <20 | <5 | <5 | <5 | <3 | <3 |

The invention claimed is:

1. Fine silica particles having an average particle size of 0.05 to 1 μm, wherein in a measurement of small-angle X-ray scattering, a fractal structure parameter $\alpha_1$ at length scales ranging from 50 nm to 150 nm and a fractal structure parameter $\alpha_2$ at length scales ranging from 150 nm to 353 nm satisfy the following formulas (1) and (2):

$$-0.0068S+2.548 \leq \alpha_1 \leq -0.0068S+3.748 \qquad (1)$$

$$-0.0011S+1.158 \leq \alpha_2 \leq -0.0011S+2.058 \qquad (2)$$

wherein S is a BET specific surface area (m²/g) of the fine silica particles, wherein surfaces of the silica particles are treated with at least one treating agent selected from the group consisting of silylating agents, silicone oils, siloxanes, metal alkoxides, fatty acids and metal salts of the fatty acids.

2. A filler for a semiconductor-encapsulation resin, 2 comprising fine silica particles of having an average particle size of 0.05 to 1 μm, wherein in a measurement of small-angle X-ray scattering, a fractal structure parameter $\alpha_1$ at length scales ranging from 50 nm to 150 nm and a fractal structure parameter $\alpha_2$ at length scales ranging from 150 nm to 353 nm satisfy the following formulas (1) and (2):

$$-0.0068S+2.548 \leq \alpha_1 \leq -0.0068S+3.748 \qquad (1)$$

$$-0.0011S+1.158 \leq \alpha_2 \leq -0.0011S+2.058 \qquad (2)$$

wherein S is a BET specific surface area (m²/g) of the fine silica particles.

3. A toner additive for electrophotography, comprising fine silica particles having an average particle size of 0.05 to 1 μm, wherein in a measurement of small-angle X-ray scattering, a fractal structure parameter $\alpha_1$ at length scales ranging from 50 nm to 150 nm and a fractal structure parameter $\alpha_2$ at length scales ranging from 150 nm to 353 nm satisfy the following formulas (1) and (2):

$$-0.0068S+2.548 \leq \alpha_1 \leq -0.0068S+3.748 \quad (1)$$

$$-0.0011S+1.158 \leq \alpha_2 \leq -0.0011S+2.058 \quad (2)$$

wherein S is a BET specific surface area (m$^2$/g) of the fine silica particles.

4. An toner additive for electrophotography according to claim 3, wherein surfaces of the silica particles are treated with at least one treating agent from the group consisting of hexamethyldisilazane, dimethyl silicone oils, γ-aminopropyltriethoxysilane and γ-(2-aminoethyl)aminopropylmethyldimethoxysilane.

* * * * *